Aug. 30, 1949.　　　　　L. SLOAN　　　　　2,480,783
METHOD OF PRODUCING FLEXIBLE
ELEMENTS OR COUPLINGS

Filed Nov. 26, 1943　　　　　　　　　　2 Sheets-Sheet 2

INVENTOR.
BY Lou Sloan
Hull r West
ATTORNEYS

Patented Aug. 30, 1949

2,480,783

UNITED STATES PATENT OFFICE 2,480,783

METHOD OF PRODUCING FLEXIBLE ELEMENTS OR COUPLINGS

Lon Sloan, Cleveland, Ohio

Application November 26, 1943, Serial No. 511,765

2 Claims. (Cl. 29—148)

This invention pertains to a method of producing flexible elements or, in a more specific aspect, to a method of producing flexible couplings that are used for connecting driving and driven members or shafts that are disposed in end to end relation and are initially characterized by, or are subject to, angular or offset parallel misalignment, or a combination of angular and offset misalignment.

The object of the invention is to provide a method by which the coupling, or the flexible element, may be simply, cheaply and satisfactorily produced by casting, or forming by an equivalent step in which a matrix is employed, from a material that is inherently resilient, a rigid unit characterized by a groove that is deep radially of the unit; machining or otherwise treating the unit while in rigid condition for connection with the parts with which it is to be used, and then removing enough material from the unit to open up the bottom of the groove and thus convert the groove into a slot so as to render the unit flexible.

In order that the method may be better understood and its possibilities and advantages comprehended, I have illustrated in the accompanying drawings, and have described below in detail, a flexible joint and a flexible element that are the products of the invention.

Figure 1:
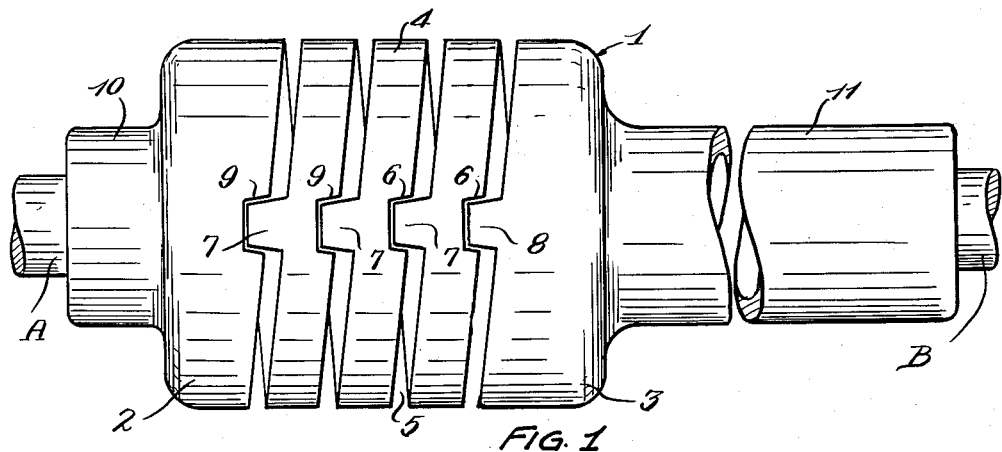
Figure 2:
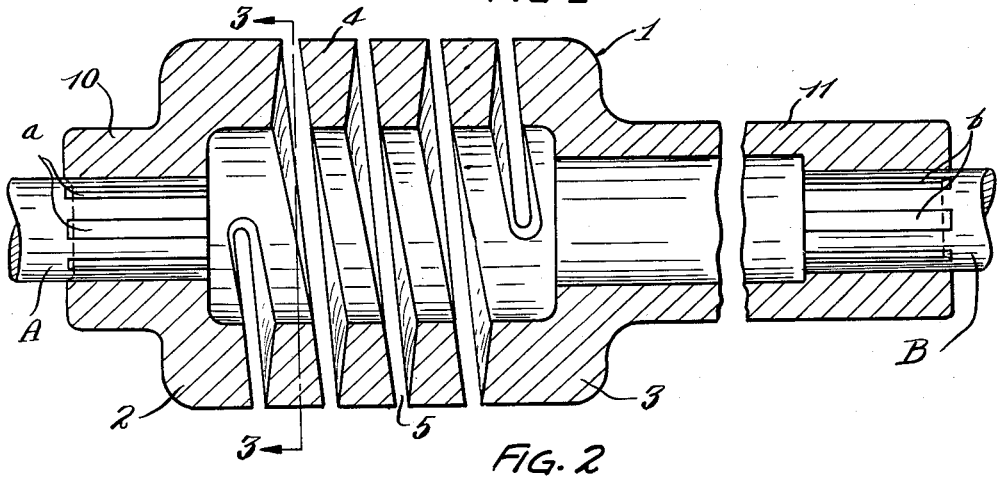
Figure 3:
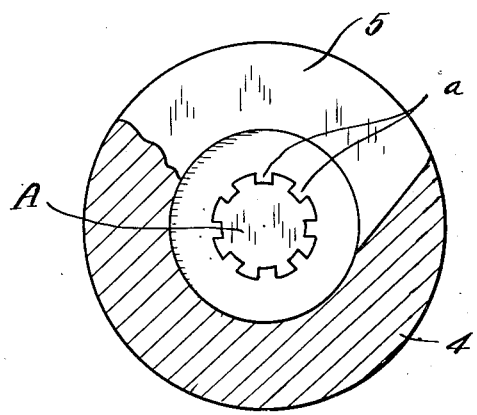
Figure 4:
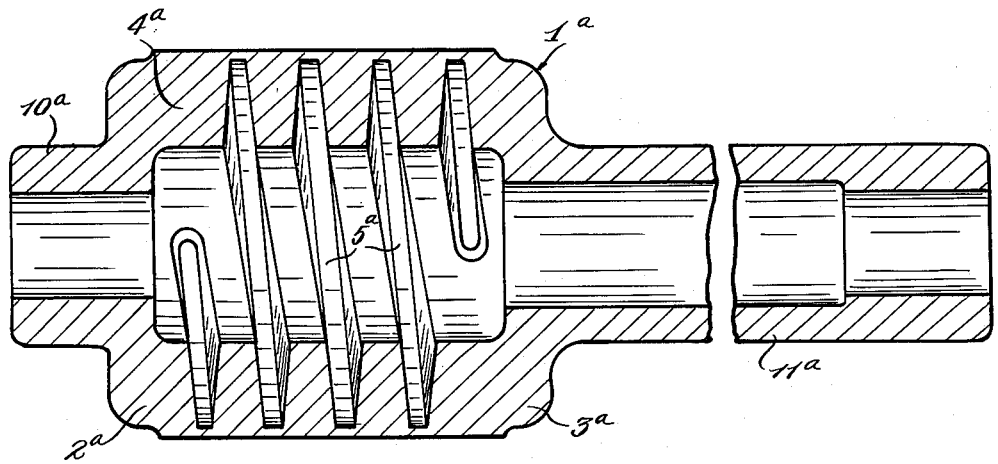
Figure 5:
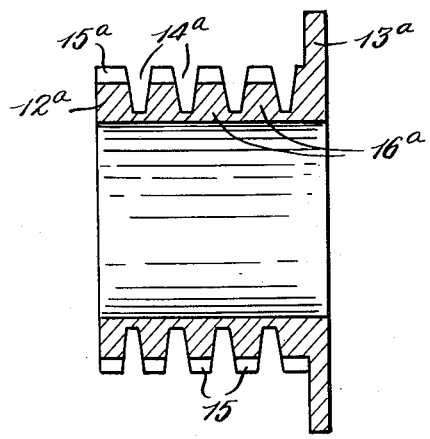
Figure 6:
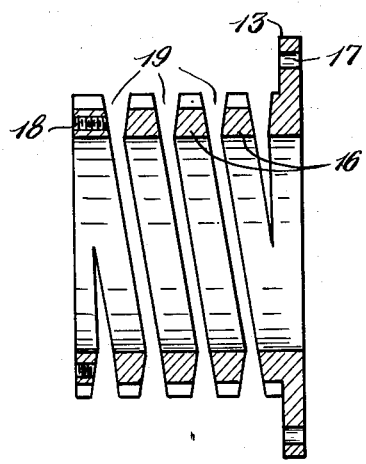

In the drawings, Fig. 1 is a side elevational view of a flexible coupling produced by my improved method; Fig. 2 is a central longitudinal section through the same; Fig. 3 is a transverse section on the line 3—3 of Fig. 2; Fig. 4 is a central longitudinal section through a so-called blank from which the coupling is produced in accordance with the method of my invention; Fig. 5 is a similar view of a blank for a helical spring intended for use in a flexible coupling of a different construction, and Fig. 6 is a longitudinal section through the spring produced in accordance with the method from the blank shown in the preceding view.

The coupling, designated generally by the reference numeral 1, is shown as connecting a driving member and a driven member, said members consisting of shafts, and for the purpose of description the one marked A may be regarded the driving member and the other, B, the driven member.

According to the present embodiment, the coupling 1 consists of a integral unit including end portions 2 and 3 that are yieldingly connected together by a spiral spring or helix 4 set off by a continuous slot 5 the ends of which, as will appear in Fig. 2, are substantially in alignment longitudinally of the unit so as to preserve dynamic balance of the coupling, it being assumed that, in pursuance of such end, the unit is symmetrical throughout its length about its longitudinal axis.

As will appear from Fig. 1, each convolution of the spring 4 is provided on one side with a recess 6, and on the other with a projection 7, the recesses and projections of the several convolutions being so arranged and related that the projection of each convolution normally reposes substantially centrally within the recess of the adjacent convolution. It will be observed, also, that the recess 6 in the right hand end convolution, as the parts are viewed in Fig. 1, receives a projection 8 on the end portion 3; while the opposite end portion 2 is provided with a recess 9 that receives the projection 7 of the other end convolution. The rather intricate construction just described, otherwise difficult of accomplishment, is easily produced by my method, as will hereinafter more fully appear.

Beyond the end portions 2 and 3 the unit is reduced in diameter to provide hubs 10 and 11, the latter, according to the present embodiment, being elongated so as to adapt the coupling to what is known as a propeller shaft installation, where the shafts that are to be connected by the coupling are spaced a considerable distance apart. Heretofore, because of the limited capacity for misalignment of prevailing couplings, two such couplings were commonly employed in propeller shaft installations, one being fastened to each shaft and the two couplings being connected together by an intermediate shaft. With the present construction, however, a single coupling may bridge the gap between the widely spaced shafts and provide ample flexibility while insuring the transmission of torque without loss of power. The interior of the hub 10, and that of the end portion of the hub 11, are, according to the present construction, broached to provide splines for cooperation with the splines $a$ and $b$ of the respective shafts A and B.

In the method of manufacturing the above described coupling, the unit or blank 1ª, shown in longitudinal section in Fig. 4, is cast or formed by an equivalent process from inherently resilient material, such, for example, as some of the alloy cast irons that are now being produced and which possess physical properties comparable to those of forged steel and commercial bar stock—one especially adapted to the purpose being known to the trade as "Meehanite."

As will be observed from Fig. 4, the blank 1ᵃ is hollow from end to end and includes an enlarged part comprising end portions 2ᵃ and 3ᵃ and a thick cylindrical wall section 4ᵃ connecting said portions and formed on its interior with a spiral groove 5ᵃ that opens through the inner surface of said wall and closely approaches the outer surface thereof. It will be understood that, in casting the blank, the cavities and groove 5ᵃ are cored.

The unit or blank is next treated or machined for attachment to the driving and driven members or shafts, as by broaching the bore of the hub 10ᵃ and the outer end portion of the bore of the hub 11ᵃ. Any other machine work necessary aside from the presently described final step may be performed while the blank is in rigid condition, after which sufficient material is removed from the periphery of the wall 4ᵃ, as by cutting, planing or grinding, to open up the groove 5ᵃ and convert the same into a continuous spiral slot, thereby to reduce the unit to the condition illustrated in Figs. 1 to 3. The convolutions of the helix 4 being thus liberated, the coupling is rendered flexible so that, when attached to the shafts, its end portions may adjust themselves to any misalignment within practical limits, whether such misalignment be of angular, parallel offset, or a combination of angular and offset misalignment. Not only does the coupling allow for such irregularities as those mentioned, but it yields to lateral or axial vibration, while serving at all times to transmit the full torque load from the driving to the driven shaft, any momentary difference in relative speeds of the two shafts being absorbed by the helix or spring 4 as reserve power to be subsequently released. It will be seen, therefore, that by virtue of the coupling starting and stopping shocks are avoided.

It will be apparent, also, that the helix or spring is protected from undue torsional deflection and consequent excessive strain by the engagement of the projections 7 and 8 with the end walls of the recesses 6 and 9; and by cooperation of said parts a delayed action positive drive is effected between longitudinally spaced portions of the coupling.

Referring again to the method, it may be pointed out that the projections 7 and 8 and the recesses 6 and 9 are desirably formed by coring offset portions in the groove 5ᵃ during casting.

By the method already described, the spring member shown in Fig. 6 is produced, by first casting, or equivalently forming from inherently resilient material the blank or unit of Fig. 5. This blank or unit comprises a cylindrical wall 12ᵃ and an end flange 13ᵃ, said wall being provided with a spiral groove 14ᵃ that opens through the outer cylindrical surface of the wall and closely approaches the inner cylindrical surface thereof. Said wall is also initially formed with longitudinal splines 15ᵃ that consist of aligned notches in the ridges 16ᵃ set off by adjacent turns of the groove 14ᵃ.

While the unit or blank is in rigid condition, its opposite ends may be finished by machining or grinding; the holes 17 and 18 (Fig. 6) may be drilled and the latter tapped, after which sufficient material is removed from the inner cylindrical surface of the wall 12ᵃ to open the groove 14ᵃ and thus convert it into a slot, designated 19 in Fig. 6, thus freeing the convolutions of the helix composed of the parts 16. The spring thus produced is used in the flexible joint described and claimed in my copending application Serial No. 511,766, filed November 26, 1943, now Patent No. 2,397,700.

Having thus described my invention, what I claim is:

1. The method of producing a flexible coupling which consists in casting in a suitable mold, from material that is inherently resilient, a rigid unit whose opposite end portions are intended for ultimate connection with a driving member and a driven member, respectively, the body of the unit intermediate said end portions being characterized by a peripheral connecting wall, producing in said wall by means of a core a groove that opens through one surface of said wall and closely approaches the opposite surface thereof, shaping the end portions of the unit for attachment to said members, and subsequently removing material from the entire area of the last mentioned surface of the wall of the unit to a sufficient depth to open said groove and convert it into a slot.

2. The method of producing a flexible coupling which consists in casting in a suitable mold, from material that is inherently resilient, a rigid unit including a cylindrical wall and producing in said wall by means of a core a spiral groove that opens through one of the cylindrical surfaces of the wall and closely approaches the other cylindrical surface thereof, the opposite end portions of the unit being intended for ultimate connection with a driving member and a driven member, respectively, shaping said end portions for attachment to the aforesaid members, and subsequently removing material from the entire area of the last mentioned cylindrical surface of said wall to a sufficient depth to open said groove and convert it into a slot.

LON SLOAN.

REFERENCES CITED

The following references are of record in the file of this patent:

UNITED STATES PATENTS

| Number | Name | Date |
|---|---|---|
| Re. 14,287 | Knudsen | Apr. 17, 1917 |
| 171,157 | Mitchell | Dec. 14, 1875 |
| 1,507,921 | Karge et al. | Sept. 9, 1924 |
| 1,668,297 | Wuerfel | May 1, 1928 |
| 1,884,029 | Luyks | Oct. 25, 1932 |
| 1,935,147 | Drexler | Nov. 14, 1933 |
| 2,167,295 | Dome et al. | July 25, 1939 |
| 2,196,841 | Sloan | Apr. 9, 1940 |
| 2,233,539 | Landrum | Mar. 4, 1941 |
| 2,236,206 | Becker | Mar. 25, 1941 |
| 2,245,764 | Dome et al. | June 17, 1941 |
| 2,343,079 | Pickwell | Feb. 29, 1944 |
| 2,358,707 | Haas | Sept. 19, 1944 |

FOREIGN PATENTS

| Number | Country | Date |
|---|---|---|
| 29,507 | Australia | Aug. 10, 1907 |
| 468,420 | Great Britain | Sept. 28, 1935 |